(12) United States Patent
Nishimura (10) Patent No.: US 6,536,569 B2
(45) Date of Patent: Mar. 25, 2003

(54) CONTROL DEVICE FOR SELECTIVE CLUTCH

(75) Inventor: Nobuyuki Nishimura, Kawasaki (JP)

(73) Assignee: Isuzu Motors Limited, Tokyo (JP)

( * ) Notice: Subject to any disclaimer, the term of this patent is extended or adjusted under 35 U.S.C. 154(b) by 9 days.

(21) Appl. No.: 09/805,672

(22) Filed: Mar. 13, 2001

(65) Prior Publication Data

US 2001/0025756 A1 Oct. 4, 2001

(30) Foreign Application Priority Data

Mar. 21, 2000 (JP) ........................................ 2000-083273

(51) Int. Cl.[7] ............................................... B60K 41/22
(52) U.S. Cl. ........................ 192/3.58; 192/3.63; 192/83; 192/103 F
(58) Field of Search .................... 192/3.58, 3.51, 192/3.57, 83, 3.63, 103 F (56) References Cited

U.S. PATENT DOCUMENTS

| 4,589,532 A | * | 5/1986 | Ito et al. ..................... 192/3.57 |
| 5,002,166 A | * | 3/1991 | Leigh-Monstevens et al. .......................... 192/3.58 |
| 5,176,234 A | * | 1/1993 | Reik et al. ................... 192/53.2 |
| 5,454,768 A | | 10/1995 | Jones et al. .................... 477/83 |
| 5,709,129 A | * | 1/1998 | Clezio ....................... 192/3.58 |
| 5,954,176 A | * | 9/1999 | Ishihara et al. ............... 192/83 |
| 5,957,806 A | * | 9/1999 | Hirose et al. ............... 192/3.58 |
| 6,056,095 A | * | 5/2000 | Grass et al. ................ 192/3.58 |
| 6,102,829 A | * | 8/2000 | Mudell et al. ............. 192/3.58 |
| 6,113,515 A | * | 9/2000 | Salecker et al. .......... 192/82 T |
| 6,170,624 B1 | * | 1/2001 | Arai et al. .................. 192/3.58 |
| 6,223,874 B1 | * | 5/2001 | Wheeler .................. 192/103 F |
| 6,352,146 B1 | * | 3/2002 | Eismann et al. ........... 192/3.56 |
| 6,364,813 B1 | * | 4/2002 | Patel et al. .................. 477/174 |

FOREIGN PATENT DOCUMENTS

| DE | 43 41 729 A1 | 6/1994 | ........... B60K/23/02 |
| DE | 197 18 051 A1 | 11/1998 | ........... B60K/41/22 |
| EP | 0 423 799 A2 | 4/1991 | ........... B60K/41/08 |
| EP | 0 909 674 A2 | 4/1999 | ........... B60K/41/22 |
| GB | 2 339 866 A | 2/2000 | ........... B60K/41/22 |

* cited by examiner

Primary Examiner—Jack Lavinder
Assistant Examiner—Benjamin A Pezzlo
(74) Attorney, Agent, or Firm—McCormick, Paulding & Huber LLP (57) ABSTRACT

A control system for a selective clutch that prevents interference with automatic engagement/disengagement of a friction clutch (2) when manual engagement/disengagement is selected at the time of starting a vehicle. The selective clutch includes an autoclutch device that automatically disengages and engages the clutch (2) using an actuator (10) under the control of a controller (6, 9). The selective clutch also includes a manual clutch device that allows engagement and disengagement of the clutch based on depressing of a clutch pedal (11). The clutch disengagement and engagement by the autoclutch device is prohibited, or the prohibition is canceled, based on a vehicle velocity (28), gear speed (23) of a gear box (3), and clutch pedal depression (16).

18 Claims, 8 Drawing Sheets

SHIFT UP MAP

FIG. 5

SHIFT DOWN MAP

FIG. 6

ROTATIONAL SPEED OF CLUTCH

CONTROL DEVICE FOR SELECTIVE CLUTCH

CROSS REFERENCE TO RELATED APPLICATION

This application claims priority under 35 USC 119 of Japanese Patent Application No. 2000-83273 filed on Mar. 21, 2000, the entire disclosure of which is incorporated herein by reference.

BACKGROUND OF THE INVENTION

1. Field of the Invention

The present invention relates to a control device for a selective clutch which is applied in a large vehicle, in particular a tractor or the like.

2. Description of the Related Art

Recently, the use of automatic gear changing devices has become widespread in large vehicles such as tractors and trucks in order to reduce the stress on drivers. The most suitable gear speed for the velocity of the vehicle is determined according to a map and a shift up or a shift down is performed automatically as a function of the acceleration or deceleration of the vehicle.

Such automatic gear changing devices are also typically equipped with an autoclutch which engages and disengages a friction clutch using an actuator. In this way, during a gear changing operation, the clutch is automatically disengaged before the gear is disengaged and the clutch is automatically engaged after the gear has been engaged. There is also so-called moving-off control in which the clutch is kept disengaged when the vehicle is in the stationary state, the gear box (transmission) is put into a moving-off gear (gear position suitable for starting of the vehicle) and then the system goes into an acceleration waiting state. After this, when the driver depresses the accelerator pedal, the clutch is gradually automatically engaged.

Some autoclutch devices can perform manual engagement and disengagement using the clutch pedal. In other words, such device is a selective clutch comprising an autoclutch and a manual clutch. The reason for this is to ensure that the clutch can be engaged and disengaged when there is a failure in a solenoid valve of the clutch automatic control or the like or to permit sensitive clutch work at very low travel speeds and the like.

However, if there is interference with the automatic engagement and disengagement operations when the driver selects manual engagement and disengagement of his own accord, there is a risk not only that the vehicle will fail to comply with the driver's wishes but also that it will sudden starting or the like especially when the vehicle is moving off.

SUMMARY OF THE INVENTION

An object of the present invention is to prevent interference with the automatic engagement and disengagement of the clutch when making manual engagement and disengagement selections.

According to one aspect of the present invention, there is provided a control device for a selective clutch that can attain the above object. The selective clutch includes an autoclutch device having a friction clutch, a clutch actuator that disengages and engages the clutch, and a controller that controls disengagement and engagement operations of the clutch by issuing commands to the clutch actuator. The selective clutch further includes a manual clutch device that disengages and engages the clutch in response to depressing and releasing of a clutch pedal. The control device for such selective clutch includes a vehicle velocity detector, a gear speed detector for detecting a gear speed of a gear box, a clutch pedal depression detector, and a second controller for prohibiting clutch disengagement and engagement by means of the autoclutch device or canceling the prohibition on the basis of detection results of said vehicle velocity detector, said gear speed detector and said clutch pedal depression detector. The autoclutch is prevented from automatically disengaging and engaging the clutch under certain circumstances such that the manual clutch disengagement and engagement is given priority over the automatic disengagement and engagement at the time of moving off the vehicle. After the vehicle enters a stable running condition, the prohibition on the automatic disengagement and engagement of the clutch is cancelled.

The second controller may prohibit the clutch disengagement and engagement by the autoclutch device when all the following conditions are fulfilled: the vehicle velocity is zero, a current gear speed or a target gear speed is other than neutral, and a gear speed prior to the current gear speed or the target gear speed is the neutral.

The second controller may cancel the prohibition on the clutch disengagement and engagement by the autoclutch device if a gear changing state is detected, or if the clutch pedal is released and a rotational speed of the friction clutch exceeds a prescribed value suitable for disengaging of the friction clutch. The prescribed value is about 900 rpm.

The second controller may not cancel the prohibition unless the friction clutch rotational speed continuously exceeds the prescribed value for a predetermined period.

Additional objects, aspects and advantages of the present invention will become apparent to those skilled in the art to which the invention pertains from the subsequent detailed description and the appended claims, taken in conjunction with the accompanying drawings.

DETAILED DESCRIPTION OF THE INVENTION

Embodiments of the present invention will be described below with reference to the appended figures.

Figure 1:
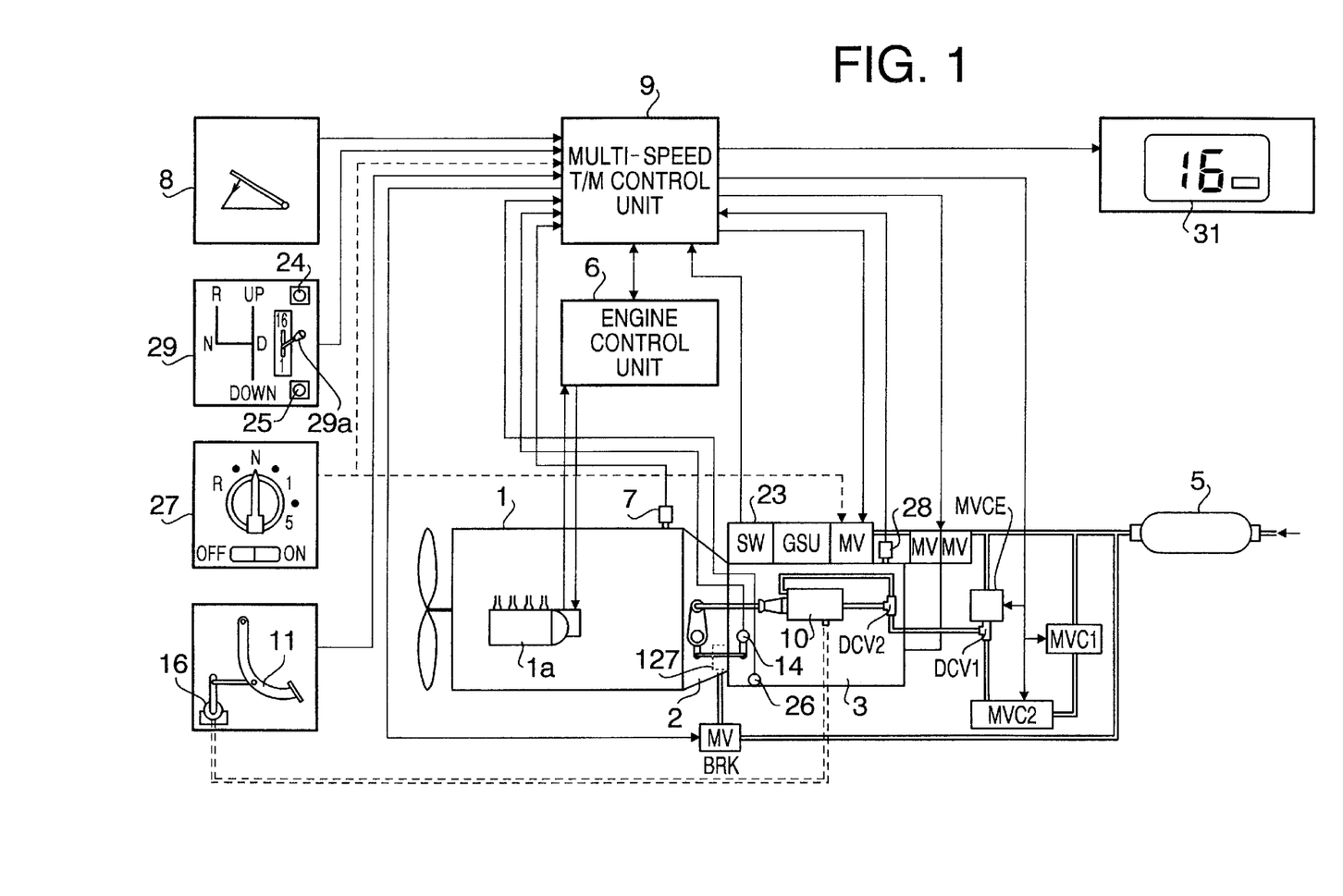
FIG. 1 illustrates a structural diagram showing an embodiment of an vehicle automatic gear changing device.

FIG. 1 shows a vehicle automatic gear changing device. Here, the vehicle is a tractor pulling a trailer, and the engine is a diesel engine. As shown in the figure, a gear box 3 is attached to the engine 1 via a clutch 2, and the rear wheels (not shown in figure) are driven by connecting the output axle 4 of the gear box 3 (cf. FIG. 2) to the propeller shaft (not shown in figure). The engine 1 is electronically controlled by the engine controller unit (ECU) 6. In other words, the current rotational speed of the engine and the current engine load which are output by the engine rotational speed sensor 7 and the sensor 8 for the degree of opening of the accelerator (accelerator pedal depression) are input into ECU 6, and mainly on the basis of these, ECU 6 controls the fuel pump 1a and controls the fuel injection period and the fuel injection quantity.

Figure 2:
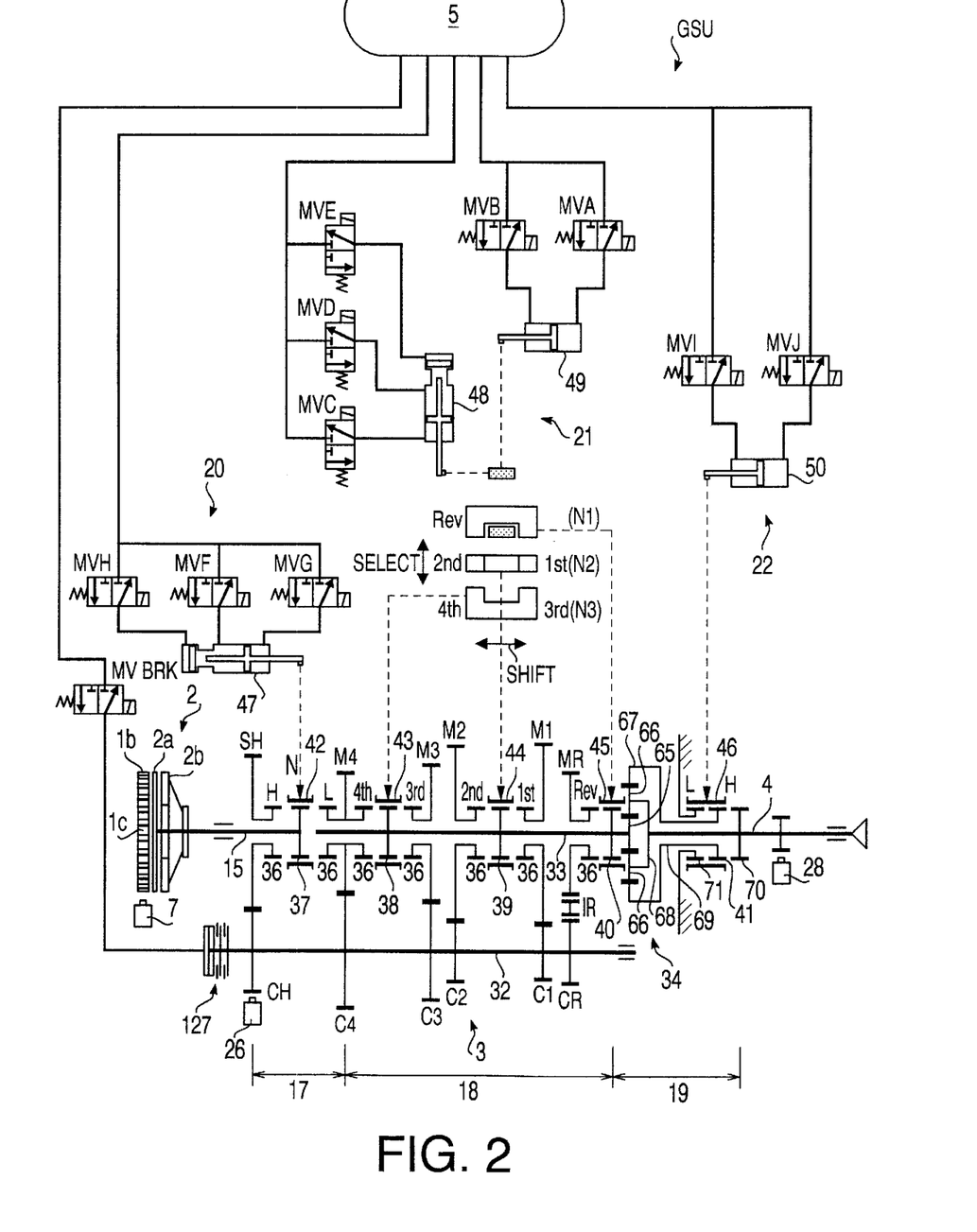
FIG. 2 illustrates a structural diagram showing an embodiment of an automatic gear box.

As shown in FIG. 2, a flywheel 1b is attached to the engine crankshaft, a ring gear 1c is formed on the outer circumference of the flywheel 1b, the engine rotational speed sensor 7 outputs a pulse every time a tooth of the ring gear 1c passes, and ECU 6 calculates the rotational speed of the engine by counting the number of pulses per unit of time.

As illustrated in FIG. 1, the clutch 2 and the gear box 3 are controlled automatically on the basis of the control signals of the transmission controller unit (TMCU) 9. In other words, the present automatic gear changing device is provided with both an autoclutch device and an automatic gear box. ECU 6 and TMCU 9 are connected to one another by a bus cable and can communicate with one another.

Figure 3:
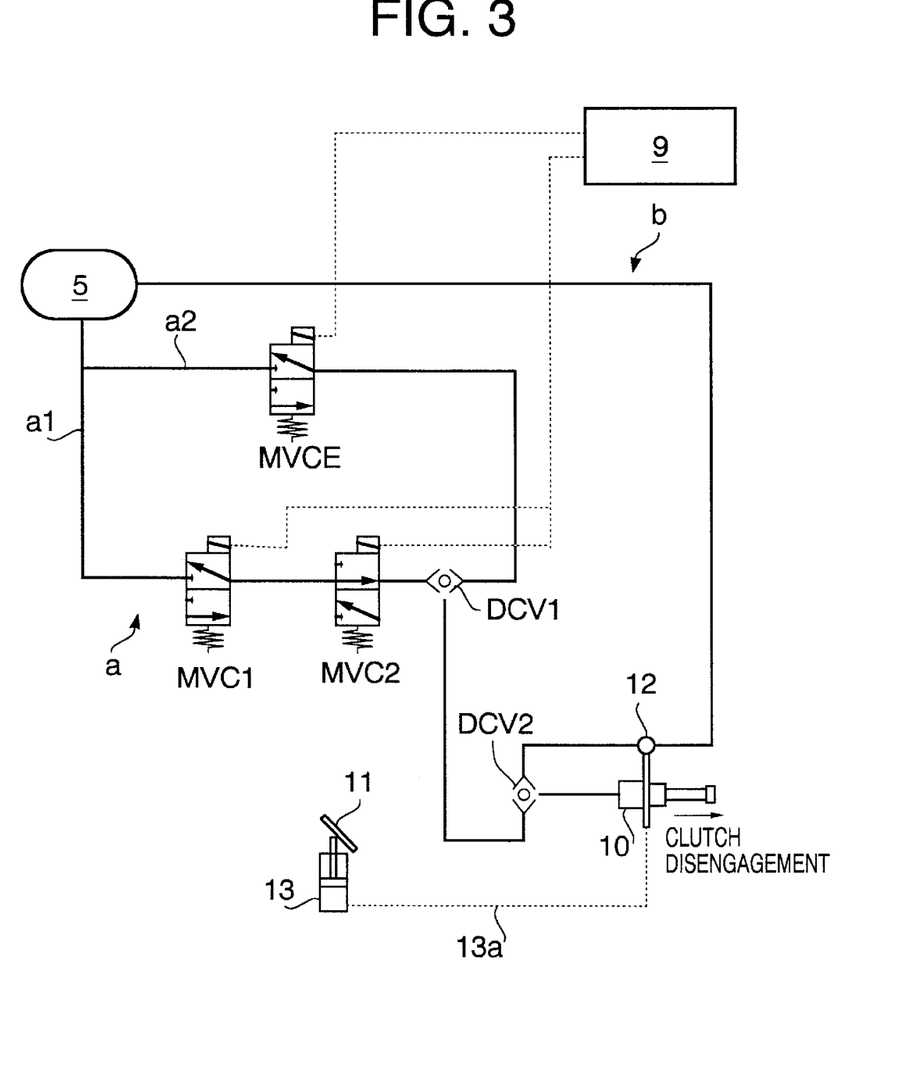
FIG. 3 is a structural diagram showing a selective clutch.

As shown in FIGS. 1, 2 and 3, the clutch 2 is a mechanical friction clutch and is constituted from the flywheel 1b which inputs power, a driven plate 2a which outputs power and a pressure plate 2b which moves the driven plate 2a into frictional engagement with or away from the flywheel 1a. The clutch 2 actuates the pressure plate 2b in the axial direction by means of the clutch booster 10, which serves as a clutch actuator, and engages and disengages the clutch basically automatically, making it possible to reduce the stress on the driver. Also, in order to perform sensitive clutch work at very low speeds and to be able to declutch quickly at times of emergency, it is also possible to engage and disengage the clutch manually using the clutch pedal 11. This is the constitution of the so-called selective clutch. A clutch stroke sensor 14 which senses the stroke of the clutch itself (in other words the position of the pressure plate 2b) and a clutch pedal stroke sensor 16 which senses how much the clutch pedal 11 is depressed on are provided and they are respectively connected to TMCU 9.

As best shown in FIG. 3, the clutch booster 10 is connected to the air tank 5 by two compressed air lines a and b indicated by the solid lines in the figure, and is operated using the air pressure supplied from the air tank 5. One of the air line a is used for automatic engagement and disengagement of the clutch while the other line b is used for manual engagement and disengagement of the clutch. The line a branches in two lines a1 and a2, and on one of these branches a1 the solenoid valves MCV1 and MCV2 for automatic engagement and disengagement are provided in series and on the other line a2 a solenoid valve MVCE for emergency use is provided. At the point of convergence a double-check valve DCV1 is provided. An oil-pressure-operated valve 12 is provided on the other line b and operatively connected to the clutch booster 10. At the point where both lines a and b converge a double-check valve DCV2 is provided. The double-check valves DCV1 and DCV2 are three-directional pressure differential-operated valves.

The abovementioned solenoid valves MVC1, MVC2 and MVCE are switched ON and OFF by TMCU 9 and in the ON state the upstream side is connected to the downstream side and in the OFF state the upstream side is blocked and the downstream side is opened to the atmosphere. The automatic mode will be described first. The solenoid valve MVC1 is only switched ON or OFF as a function of the ON or OFF state of the ignition key (not shown). When the ignition key is in the OFF state, in other words when the vehicle is stationary, said valve is OFF and the air pressure from the air tank 5 is disconnected. The solenoid valve MVC2 is a proportional control valve which can freely control the amount of air supplied or the amount of air exhausted. This is necessary to control the speed of the engagement/disengagement of the clutch. When the solenoid valves MVC1 and MVC2 are both ON, the air pressure from the air tank 5 switches the double-check valves DCV1 and DCV2 and is supplied to the clutch booster 10. In this way, the clutch is disengaged. When the clutch is connected, only the solenoid valve MCV2 is placed in the OFF state. This discharges the air pressure of the clutch booster 10 from the solenoid MCV2, and as a result the clutch is connected.

If a malfunction occurs at the solenoid valve MVC1 or MVC2 while the clutch is separated and that solenoid valve goes into the OFF state, the clutch is suddenly engaged contrary to the driver's wishes. To prevent this, when the malfunction is detected by the malfunction diagnostic circuit of TMCU 9, the solenoid valve MVCE is immediately switched ON. When this happens, the air pressure passing through the solenoid valve MVCE switches over the double-check valve DCV1 in the opposite direction and is supplied to the clutch booster 10. Accordingly, the clutch separation is maintained and the clutch is prevented from suddenly engaging.

Next, the manual operation will be described. Oil pressure is supplied to and discharged from the master cylinder 13 as the clutch pedal 11 is stamped and released, and this oil pressure is supplied to the hydraulic valve 12 via the hydraulic line 13a shown by dotted lines. This causes the hydraulic valve 12 to open and close, the air pressure is supplied to and discharged from the clutch booster 10, and the manual engagement and disengagement of the clutch 2 is performed. When the hydraulic valve 12 opens, the air pressure passing through it switches over the double-check valve DCV2 and reaches the clutch booster 10.

As shown in detail in FIG. 2, the gear box 3 is basically a normally engaging so-called multi-speed gear box and it can be shifted into 16 forward gears and 2 reverse gears. The gear box 3 is provided with a splitter 17 and a range gear 19 as auxiliary gear boxes on the input and output sides, and the main gear stage 18 is provided between them. Then, the engine power transmitted to the input axle 15 is successively transmitted to the splitter 17, main gear stage 18 and range gear 19 and output to the output axle 4.

A gear shift unit GSU is provided for performing automatic gear changing of the gear box 3, and includes a splitter actuator 20, a main actuator 21 and a range actuator 22 which control the respective gear changing operations of the splitter 17, main gear stage 18 and range gear 19. These actuators are operated by air pressure in the same way as the clutch booster 10 and are controlled by means of TMCU 9. The current position of each gear 17, 18, 19 is detected by means of the gear position switch 23 (cf. FIG. 1). The rotational speed of a counter shaft 32 is detected by means of the counter shaft rotational speed sensor 26 and the rotational speed of the output axle 4 is detected by the output axle rotational speed sensor 28. These detection signals are transmitted to TMCU 9.

A manual mode is provided in this automatic gear box and manual gear changing is possible on the basis of the manual shift change operations by the driver. In this case, as shown in FIG. 1, the control of the engagement and disengagement of the clutch 2 and the control of the gear changing operations by the gear box 3 are carried out in response to the gear speed shifting instruction signals from the shift lever device 29 provided near the driver's seat. In other words, when the driver carries out manual shift operations using a shift lever 29a of the shift lever device 29, a shift switch incorporated in the shift lever device 29 is operated and the gear speed shifting instruction signals are transmitted to TMCU 9. On the basis of said signals TMCU 9 suitably actuates the clutch booster 10, splitter actuator 20, main actuator 21 and range actuator 22, and the series of gear speed shifting operations are carried out (clutch disengagement→gear disengagement→gear engagement→clutch engagement). Then, TMCU 9 displays the current shift speed on a monitor 31.

In the shift lever device 29, R is reverse, N is neutral, D is drive, UP is shift up and DOWN is shift down. In addition, a mode switch 24 which switches over the gear-changing mode between automatic and manual, and a skip switch 25 which switches over between implementing gear changes one gear speed at a time and implementing them with skips are provided near the driver's seat.

If the shift lever 29a has been placed in the D range when the system is in the automatic shift mode, a gear change is performed automatically in response to the velocity of the vehicle. In addition, if the driver moves the shift lever 29a to UP or DOWN in this automatic gear-changing mode, the driver can shift up or down manually. If the skip switch 25 is OFF in this automatic gear-changing mode (ordinary mode), the gear is changed one gear speed by each manual UP or DOWN movement of the shift lever 29a. This is effective when towing trailers etc. with comparatively heavy loads. In addition, if the skip switch 25 is ON (skip mode), the gear change skips one gear speed. This is effective when a trailer is not being towed or the load is light.

In manual gear-changing mode the gear change corresponds completely to the driver's wishes. When the shift lever 29a is in the D range, a gear change does not take place, the current gear speed is held. A shift up or a shift down can be performed only when the driver intentionally moves the shift lever 29a to UP or DOWN. At this time also, if the skip switch 25 is OFF, each manual operation causes the gear to change by one gear speed, and if the skip switch is ON, the gear change skips one gear speed each time. In this mode, the D range becomes the H (hold) range in which the current gear is held.

An emergency gear-change switch 27 is provided near the driver's seat. If there is a failure in the GSU solenoid valve or the like, it is possible to perform a gear change by manually switching the switch 27.

As shown in FIG. 2, in the gear box 3 the input axle 15, main shaft 33 and output axle 4 are arranged coaxially, and the counter shaft 32 is arranged below them in a parallel position. The input axle 15 is connected to the driven plate 2a of the clutch 2, and the input axle 15 and the main shaft 33 are supported so as to be capable of rotating with respect to each other.

Firstly an explanation will be given of the splitter 17 and the main gear stage 18. The split high gear SH is attached to the input axle 15 so as to be capable of rotating. In addition, the main gears M4, M3, M2, M1 and MR are also rotatably attached (in this order from the front) to the main shaft 33. Except for the gear MR, the gears SH, M4, M3, M2 and M1 are always intermeshed with counter gears CH, C4, C3, C2 and C1 which are respectively fixed to the counter shaft 32. The gear MR is always intermeshed with the idle reverse gear IR. The idle reverse gear IR is always intermeshed with the counter gear CR fixed to the counter shaft 32.

The splines 36 are provided for the gears SH, M4 . . . attached to the input axle 15 and main shaft 33 in order to allow said gears to be selected, and first to fourth splines 37 to 40 are fixed to the input axle 15 and main shaft 33, adjacent to said splines 36. First to fourth sleeves 42 to 45 always fit into the first to fourth splines 37 to 40 and are capable of sliding backwards and forwards. Engagement and disengagement of a gear can be performed by suitably selecting the first, second, third or fourth sleeve 42, 43, 44 or 45 and moving it with a sliding motion, thus engaging it with and disengaging it from the associated gear spline 36. The first sleeve 42 is moved by the splitter actuator 20 and the second to fourth sleeves 43 to 45 are moved by the main actuator 21.

In this way, the splitter 17 and the main gear 18 are constituted as always engaged type in which the automatic gear change is performed by means of the respective actuators 20 and 21. It should be noted that although there is an ordinary mechanical synchronizing device in the spline portion of the splitter 17, there is no synchronizing device in the spline portion of the main gear stage 18. For this reason, the synchronization control is performed to match the engine rotational speed with the gear speed whereby it becomes possible to change gears without a synchronizing mechanism. Here, not only the main gear 18 but also the splitter 17 are provided with a neutral position and countermeasure against rattling noise is implemented (please see Japanese Patent Application No. 11-319915 filed Nov. 10, 1999 or corresponding U.S. patent application Ser. No. 09/707,897 filed Nov. 7, 2000 entitled "MULTI-STAGE TRANSMISSION OF VEHICLE", the entire disclosure of which is incorporated herein by reference.

Next, a description will be given of the structure of the range gear 19. A planetary gear mechanism 34 is used in the range gear 19 and it can be switched into either the high or low position. The planetary gear mechanism 34 is composed of a sun gear 65 fixed to the rear end of the main shaft 33, a plurality of planetary gears 66 which are intermeshed with its outer circumference of the sun gear 65 and a ring gear 67 which has inner gearing which is intermeshed with the outer circumference of the planetary gears 66. The planetary gears 66 are rotatably supported by a common carrier 68, and the carrier 68 is connected to the output axle 4. The ring gears 67 have an integral tubular portion 69, which is fitted onto the outer circumference of the output axle 4 so as to be capable of performing relative rotation with respect to one another, and which forms dual axles together with the output axle 4.

The fifth spline is 41 is provided integrally in the tubular portion 69. In addition, an output axle spline 70 is provided integrally in the output axle 4 adjacent to the rear part of the fifth spline 41. A fixed spline 71 is fixed to a transmission casing adjacent to and in front of the fifth spline 41. A fifth sleeve 46, which is always engaged with the fifth spline 41, is provided so as to be capable of sliding backward and forward. The sliding movement of the fifth sleeve 46 is carried out by means of the range actuator 22. Synchronizing mechanisms are provided in the spline portions of the range gear 19.

When the fifth sleeve 46 moves forward, it engages with the fixed spline 71, and the fifth spline 41 and the fixed spline 71 are connected. By this means, the ring gear 67 is fixed to the transmission casing and the output axle 4 is rotated with a speed reduction ratio greater than 1. This is the low position.

On the other hand, when the fifth sleeve 46 moves backward and engages in the output axle spline 70, the fifth spline 41 and the output axle spline 70 are connected, as a result of which the ring gear 67 and the carrier 68 are fixed to one another and the output axle 4 is driven directly with a speed reduction ratio of 1. This is the high position.

With the forward gear of this gear box 3, therefore, it is the possible to change gear into two stages, high and low, in the splitter 17, four stages in the main gear stage 18 and two stages, high and low, in the range gear 19. Thus, the gear speed changes are possible in a total of 2×4×2=16 stages. With the reverse gear, it is possible to change gear in 2 stages by switching between high and low at the splitter 17 alone.

Next a description will be given of the actuators 20, 21 and 22. These actuators are constituted from pneumatic cylinders which activate using air pressure from the air tank 5, and from solenoid valves which switch the supplying and discharging of the air pressure to and from the pneumatic cylinders. These solenoid valves are selectively switched by TMCU 9 and the pneumatic cylinders are selectively activated.

The splitter actuator 20 is constituted from a pneumatic cylinder 47 having a double piston and from three solenoid valves MVH, MVF and MVG. When the splitter 17 is put into neutral, the solenoid valve MVH is switched to ON, the solenoid valve MVF to OFF, and the solenoid valve MVG to ON. When the splitter 17 is put into the high state, the solenoid valve MVH is switched to OFF, the solenoid valve MVF to OFF and the solenoid valve MVG to ON. When the splitter 17 is put into the low state, the solenoid valve MVH is switched to OFF, the solenoid valve MVF to ON and the solenoid valve MVG to OFF.

The main actuator 21 is equipped with a pneumatic cylinder 48 having a double piston that controls the operations of selection, and with a pneumatic cylinder 49 having a single piston that controls the operations of shifting. Three solenoid valves MVC, MVD and MVE are associated with the pneumatic cylinder 48, and two solenoid valves MVB and MVA are associated with the pneumatic cylinder 49.

When the solenoid valve MVC is switched to OFF, the solenoid valve MVD to ON, and the solenoid valve MVE to OFF, the pneumatic cylinder 48 moves downward in the diagram and makes it possible to select the 3rd, 4th or N3 (neutral between the third and fourth gears) of the main gear assembly. When the solenoid valve MVC is switched to ON, the solenoid valve MVD to OFF and the solenoid valve MVE to ON, the pneumatic cylinder 48 is brought into a neutral condition and makes is possible to select the 1st, 2nd or N2 (neutral between the first and second gears) of the main gear assembly. When the solenoid valve MVC is switched to ON, the solenoid valve MVD to OFF and the solenoid valve MVE to OFF, the pneumatic air cylinder 48 moves upward in the diagram and it is possible to select Rev (reverse gear) or N1 of the main gear assembly.

When the solenoid valve MVA is switched to ON and the solenoid valve MVB to ON, the other air cylinder 49 moves to a neutral condition and enables selecting the N1, N2 or N3 of the main gear assembly. When the solenoid valve MVA is switched to ON and the solenoid valve MVB to OFF, the air cylinder 49 moves to the left in the diagram and it is possible to select the 2nd, 4th or Rev of the main gear. When the solenoid valve MVA is switched to OFF and the solenoid valve MVB to ON, the pneumatic cylinder 49 moves to the right in the diagram and it is possible to select the 1st or 3rd of the main gear.

The range actuator 22 is constituted from a pneumatic cylinder 50 having a single piston, and from two solenoid valves MVI and MVJ. When the solenoid valve MVI is ON and the solenoid valve MVJ is OFF, the pneumatic cylinder 50 moves to the right in the diagram and changes the range gear 19 to high (high speed position). When the solenoid valve MVI is OFF and the solenoid valve MVJ is ON, said pneumatic cylinder 50 moves to the left in the diagram and changes the range gear 19 to low.

A counter shaft brake 127 is provided on the counter shaft 32 in order to brake the counter shaft 32 during the synchronization control of the main gear 18. The counter shaft brake 127 is a wet-type multi-plate brake and is operated by the air pressure from the air tank 5. A solenoid valve MV BRK is provided in order to switch the supplying and discharging of this air pressure. When the solenoid valve MV BRK is turned on, the air pressure is supplied to the counter shaft brake 127 and the counter shaft brake 127 is activated. When the solenoid valve MV BRK is turned off, the air pressure is discharged from the counter shaft brake 127 and the counter shaft brake 127 is deactivated. More detail of the counter shaft brake can be found in Japanese Patent Application No. 2000-83274 or corresponding U.S. patent application Ser. No. 09/770,117 filed Jan. 23, 2001, entitled "LUBRICATION SYSTEM FOR COUNTER-SHAFT BRAKE", the entire disclosures of which are incorporated herein by reference.

Figure 4:
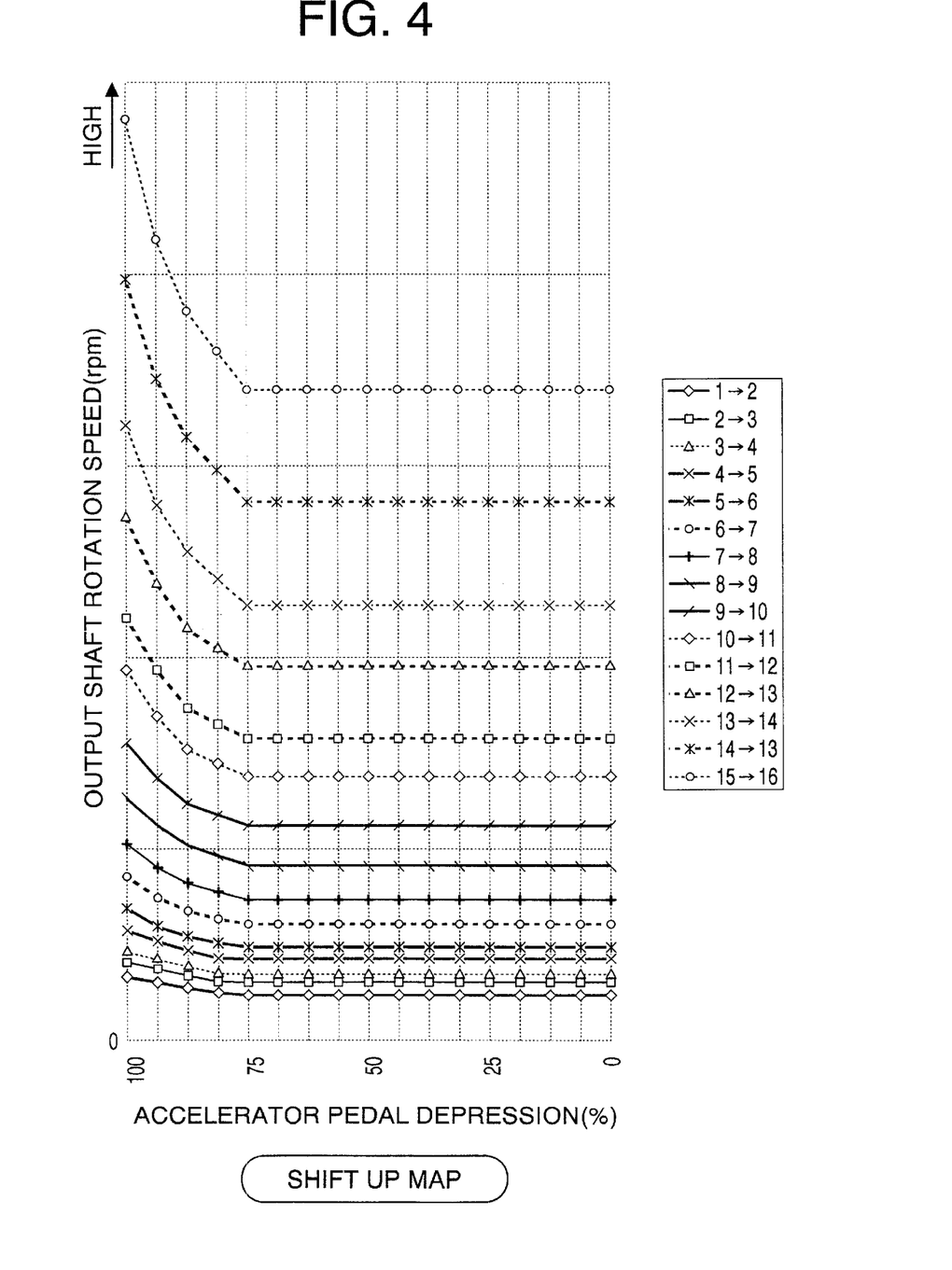
FIG. 4 is a shift up map.
Figure 5:
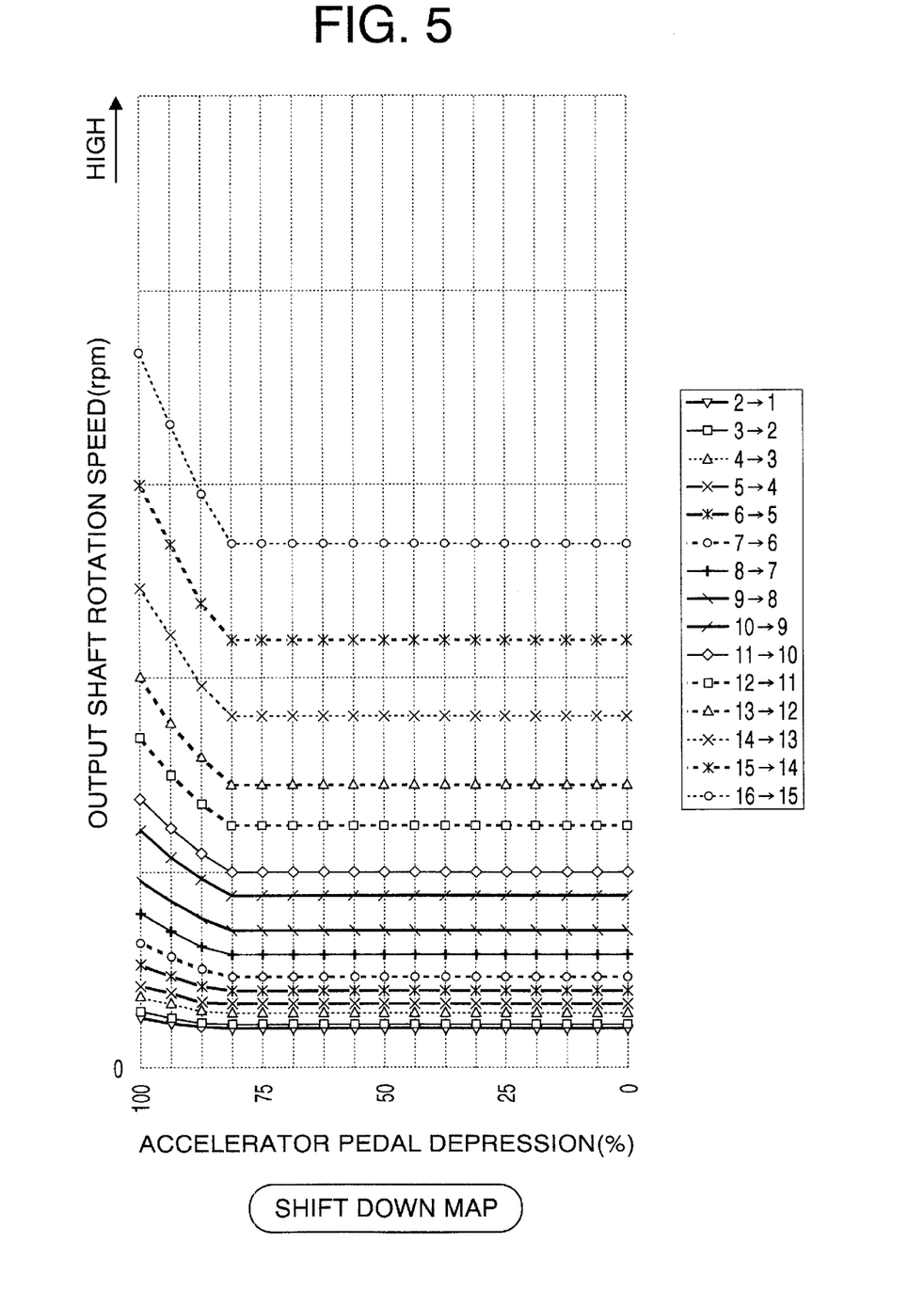
FIG. 5 is a shift down map.

Next, a description will be given of particulars of the control of the automatic gear changing operations. The shift-up map shown in FIG. 4 and the shift-down map shown in FIG. 5 are stored in TMCU 9. In the automatic gear-change mode, TMCU 9 carries out automatic gear changes in accordance with these maps. In the shift-up map in FIG. 4, the shift-up line from the stage n (n is an integer from 1 to 15) to n+1 is determined as a function of the accelerator pedal depression (%) and the rotational speed (rpm) of the output shaft 4. A single point is determined on the map from the current accelerator pedal depression and the output shaft rotational speed. As the vehicle accelerates, the rotational speed of the output shaft 4 connected to the wheels gradually increases. In the normal automatic gear-changing mode, a shift-up is performed by one gear speed every time a current point exceeds the lines on the graph. If the device is in the skip mode, a shift-up is performed by two gear speeds each time, skipping alternate lines.

In FIG. 5, the shift-down line from gear stage n+1 (n is an integer between 1 and 15) to n is also determined using a function between the accelerator pedal depression (%) and the output shaft rotational speed (rpm). A single point is determined on the map from the current accelerator pedal depression and the output shaft rotational speed. While the vehicle is decelerating, the rotational speed of the output shaft 4 gradually decreases so that in the normal shift mode, a shift-down occurs by one gear speed every time the current single point exceeds the lines on the graph. In the skip shift mode, a shift-down is performed by two gear speeds each time, skipping alternate lines.

In the manual gear-changing mode, on the other hand, the driver can freely perform shift-up and shift-down operations regardless of these maps. In the normal shift mode, it is possible to perform a gear change by one gear speed with a single shifting operation. In the skip shift mode, it is possible to perform a gear change by two gear speeds with a single shifting operation.

The current accelerator pedal depression is sensed by the sensor 8 for the accelerator pedal depression, and the current output shaft rotational speed is sensed by the sensor 28 for the output shaft rotational speed. TMCU 9 calculates the current velocity of the vehicle from the current rotational speed value of the output shaft and displays it on the speedometer. In other words, the vehicle velocity is sensed indirectly from the output shaft rotational speed. The output shaft rotational speed and the vehicle velocity are proportional to one another.

Next a description will be given of the clutch control.

In the present embodiment, the moving-off control described below is performed when a vehicle moves off such that the driver can easily start the vehicle by merely operating the accelerator pedal. In other words, when the vehicle is in the stationary state (vehicle velocity is essentially zero), the clutch is held in the disengaged state and the gearbox has been put into a certain gear position suitable for the moving-off, the system goes into a state in which it waits for the accelerator to be stepped on (stand-by state for the accelerator pedal depression). Subsequently, if the driver depresses the accelerator pedal, the clutch is gradually automatically engaged in proportion to the accelerator pedal depression, and the vehicle moves off.

Figure 6:
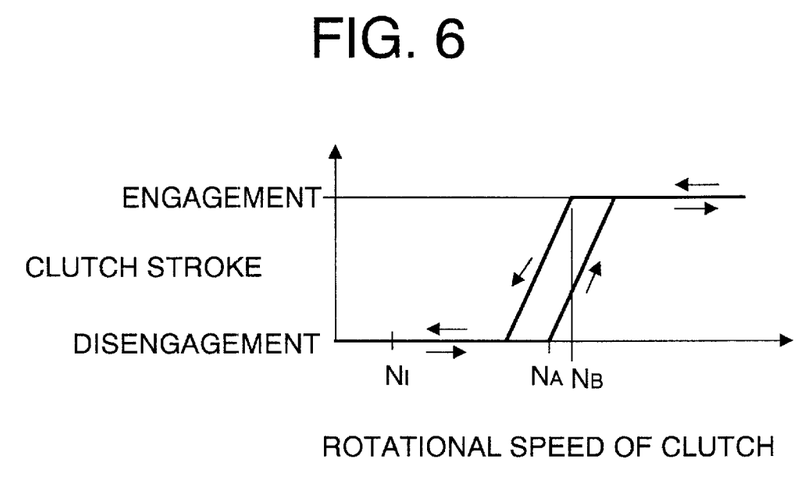
FIG. 6 is a graph showing clutch engagement/disengagement control based on the rotational speed of the clutch.

In addition, the clutch is automatically engaged and disengaged in response to the increase or decrease in the rotational speed of the clutch. This property is shown in FIG. 6. The rotational speed of the clutch corresponds to the rotational speed of the driven plate 2a (output side) of the clutch 2 or the rotational speed of the input shaft 15 of the gear box 3 and is equivalent to the rotational speed of the engine when the clutch is in the engaged state.

As shown in FIG. 6, when a prescribed value $N_A$ is reached by the increasing rotational speed of the clutch, the clutch is automatically engaged. In contrast, when another prescribed value $N_B$ is reached by the decreasing rotational speed of the clutch, the clutch is automatically disengaged. $N_A$ is smaller than $N_B$, and here $N_A=900$ (rpm) and $N_B=1000$ (rpm). $N_A$ and $N_B$ are higher than the idling speed $N_I$ of the engine. Here $N_I=500$ (rpm).

The rotation of the clutch is calculated from the rotation of the counter shaft which is sensed by the counter shaft rotation speed sensor 26. In other words, TMCU 9 stores the teeth numbers and the gear ratios of the gear pairings inside the gear box, and calculates the clutch rotational speed $N_1$ from the counter shaft rotational speed $N_2$, the teeth number $Z_1$ of the split high gear SH (also known as the input gear) and the teeth number $Z_2$ of the counter gear CH (also known as the input counter gear) using the following formula:

$$N_1=(Z_2/Z_1)\times N_2$$

The clutch rotational speed is sensed indirectly using the counter shaft rotational speed sensor 26 for reasons such as the impossibility of installing a sensor which senses the clutch rotation speed directly because of the spatial conditions. However, there is, of course, the possibility of the modified exemplary embodiment in which said sensor is installed.

The clutch engagement is controlled in this way as a function of the increase in the clutch rotational speed for the following reason. For example, when the vehicle is moving off on a negative incline, if the brakes are released in the state of waiting for the accelerator to be depressed, the vehicle goes into a state of coasting travel (coasts) and steadily moves down the incline. At such a time, the engine is braked by automatically engaging the clutch. At this time, the gear box is in a gear-in state so that as the vehicle's velocity increases starting from a stationary state the clutch rotational speed also increases. When the clutch rotation speed has reached the prescribed value $N_B$, the clutch is automatically engaged.

The clutch disengagement control is performed upon dropping of the clutch rotation speed for the reasons described below. For instance, while the vehicle is moving, the driver may decelerate the vehicle by releasing the accelerator pedal in the gear-in state and clutch engaged state (including coasting under such circumstances). In this situation, if the engine revolution speed becomes excessively slow, the engine does not run smoothly so that the driver feels uncomfortable and the vehicle may stall. To avoid such inconveniences, the clutch is automatically disengaged when the clutch rotation speed reaches the predetermined value $N_B$.

If the driver depresses the accelerator pedal 11 to make the vehicle move off manually and there is interference with the automatic clutch engagement/disengagement, the vehicle will not move off in accordance with the driver's wishes. In other words, at the time of the moving-off control, the clutch engagement increases in proportion to the accelerator pedal depression. Because of this, when moving off under manual control, the clutch will be engaged automatically when the driver simply steps on the accelerator pedal and even if the clutch pedal is not released.

In this invention, in order to avoid this, if the clutch is engaged and disengaged manually when the vehicle is moving off, the automatic engagement and disengagement of the clutch is suspended entirely. Manual operation is automatically given priority.

The situation at the time of the manual moving off is as follows. In the vehicle stationary state, the driver firstly depresses the clutch pedal 11 and substantially at the same time moves the shift lever 29a out of the neutral (N) to another gear position (D or R). When this is done, the clutch 2 is separated and the gear box is placed in the gear-in state in the specified moving-off gear speed stored beforehand in TMCU 9 (for example the 4th forward gear speed). Next, the driver releases the clutch pedal 11 while depressing the accelerator pedal whereby the clutch engages as the engine is accelerated.

Figure 7:
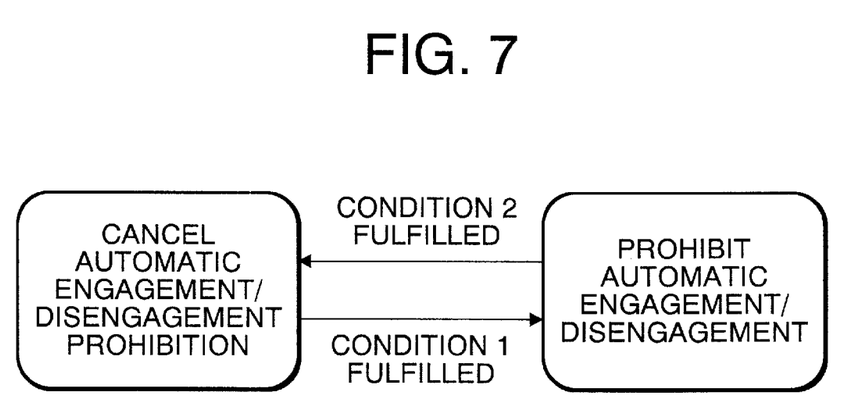
FIG. 7 shows switching between automatic clutch engagement/disengagement and its prohibition according to Conditions 1 and 2.

The general principle of this control is depicted in FIG. 7. The usual control state is the "prohibition on automatic engagement and disengagement cancelled" state on the left side in the drawing, in other words the state in which automatic engagement and disengagement of the clutch is possible. Then, when "Condition 1" mentioned below is fulfilled, the system goes into the "automatic engagement and disengagement prohibited" state on the right side in the drawing, in other words a state in which automatic engagement and disengagement of the clutch are impossible. Meanwhile, when "Condition 2" is fulfilled, the system goes from "automatic engagement and disengagement prohibited" state into the "prohibition on automatic engagement and disengagement lifted" state.

Figure 8:
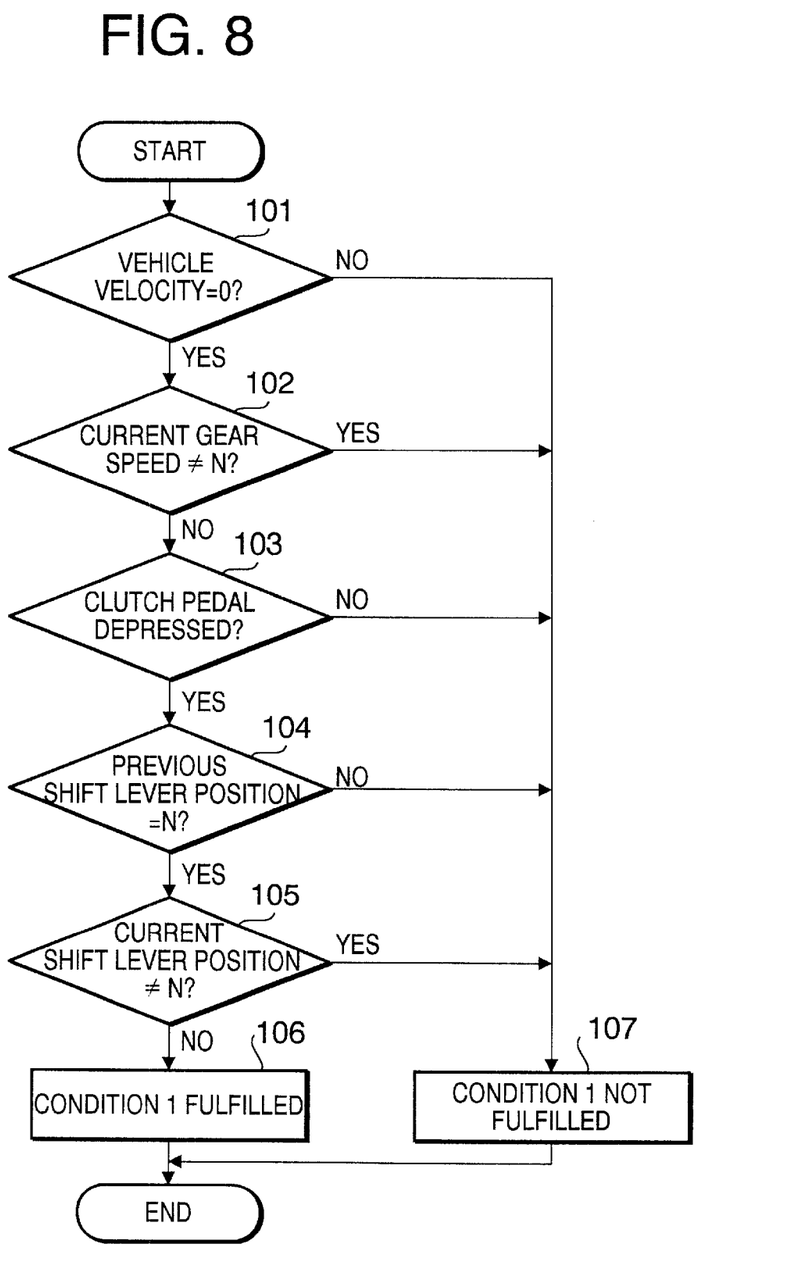
FIG. 8 illustrates a flowchart for determining whether Condition 1 is fulfilled.
Figure 9:
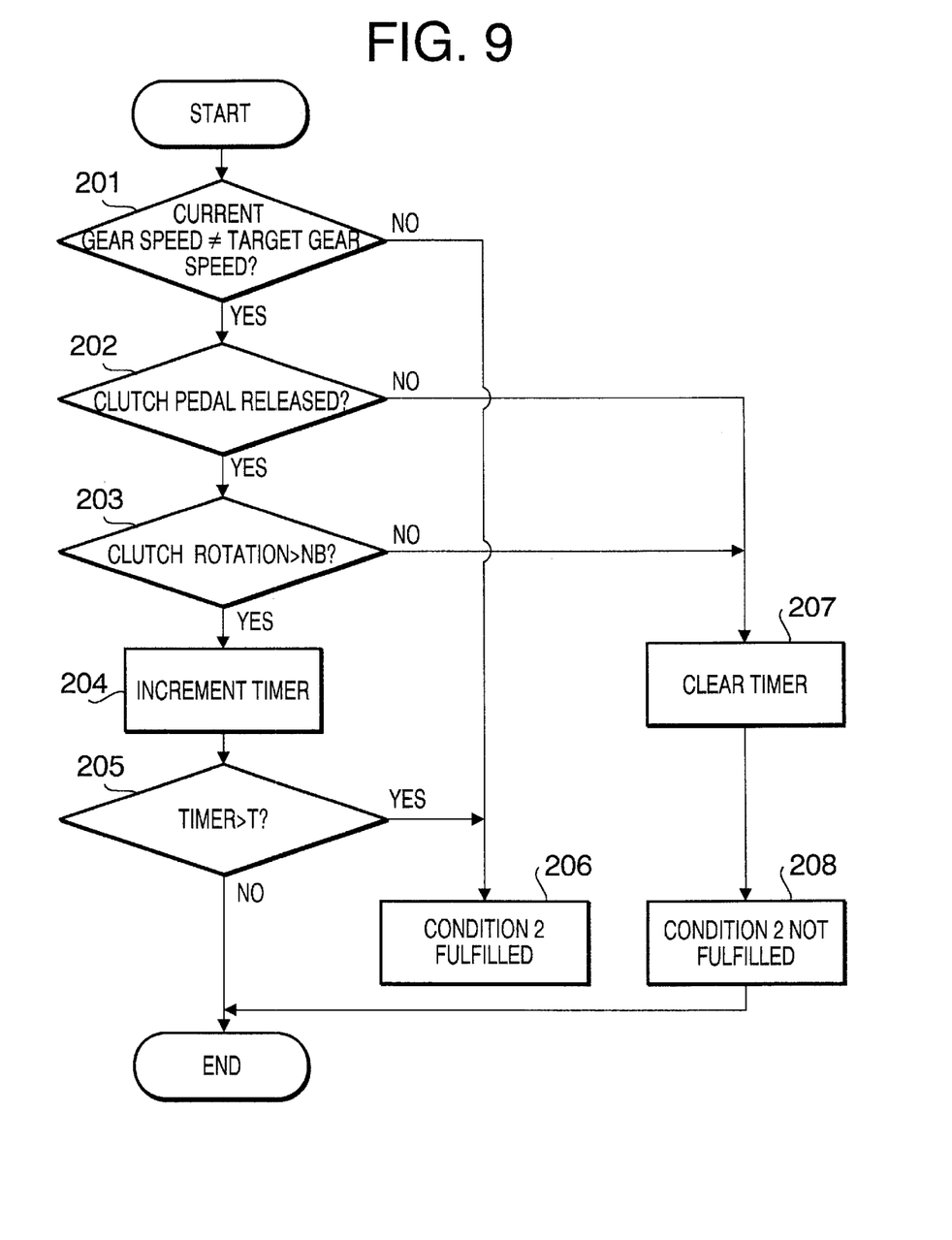
FIG. 9 illustrates a flowchart for determining whether Condition 2 is fulfilled.

FIGS. 8 and 9 respectively show flowcharts for determining fulfillment of "Condition 1" and "Condition 2". These processings in the flowcharts are implemented by TMCU 9, and the gear change mode is implemented either automatically or manually. Generally "Condition 1" is a condition according to which it can be determined that the vehicle is about to perform manual moving off, and "Condition 2" is a condition according to which it is possible to determine a state in which the vehicle is already moving along smoothly after the moving-off state has terminated.

As depicted in FIG. 8, TMCU 9 firstly determines in step 101, on the basis of the output of the output shaft rotational speed sensor 28, whether the current velocity of the vehicle is zero, in other words whether the vehicle is in the stationary state. If the velocity of the vehicle is not zero, the system moves on to step 107 and it is determined that Condition 1 is not fulfilled. If the vehicle is zero, the system moves on to step 102.

In step 102, it is determined, on the basis of the output of the gear position switch 23, whether the current gear speed is not neutral (N), in other words whether the current state is a gear-in state. If the gearbox is in neutral, the system moves onto step 107, and it is determined that Condition 1 is not fulfilled, and when the gearbox in not in neutral the system moves on to step 103.

In step 103, it is determined whether the clutch pedal 11 has been depressed. Specifically, it is determined, on the basis of the output of the clutch pedal stroke sensor 16, whether the clutch pedal is depressed for a specific time period. The clutch pedal stroke sensor 16 outputs a voltage signal as a function of how deep the clutch pedal 11 has been depressed so that it is possible to determine whether the output voltage of the clutch pedal output sensor 16 is at the voltage value corresponding to clutch disengagement for a specific time period. This output voltage is, for example, 3V or above and the certain time period is, for example, 1 second.

If it is determined that the clutch pedal 11 has not been depressed for a specific time period, the system moves on to step 107 and it is determined that Condition 1 is not fulfilled. If it is determined that clutch pedal 11 has been depressed for a specific time period, the system moves on to step 104.

In step 104 it is determined whether the previous position of the shift lever 29a is neutral. That is to say, TMCU 9 constantly checks the position of the shift lever 29a on the basis of a signal from the shift switch incorporated in the shift lever device 29, and thus determines whether the previous position of the shift lever was the neutral position. If it was other than neutral, the system moves on to step 107 and it is determined Condition 1 is not fulfilled. If it is neutral the system moves on to step 105.

In step 105 it is determined whether the current position of the shift lever is not neutral, in other words it is determined whether the position is D or R. If it has been determined that it is neutral, the system moves on to step 107 and it is determined Condition 1 is not fulfilled, while if it is determined that the position is other than the neutral position, the system moves on to step 106 and it is determined Condition 1 is fulfilled.

If Condition 1 is fulfilled, the system is brought into an automatic engagement and disengagement prohibition state. Specifically, TMCU 9 holds all the solenoid valves MVC1, MVC2 and MVCE shown in FIG. 3 in the OFF state.

Next, the sequence in FIG. 9 will be described. This sequence is implemented repeatedly every specified time period (for example, at intervals of 32 ms). TMCU 9 firstly determines, in step 201, whether the current gear speed and the target gear speed do not correspond. The current gear speed means the actual gear speed detected at the gear position switch 23. The target gear speed means the gear speed selected by the driver, detected by the shift switch of the shift lever device 29 (i.e., the next gear speed decided by the driver). If the current gear speed and the target gear speed match, this means that a gear change is not being performed. If they do not match, it means that a gear change is currently being performed. Accordingly it is determined at this point whether the gear speed change is currently proceeding.

If it is determined that a gear change is being performed, the system moves on to step 206 and it is determined Condition 2 is fulfilled. This is because while the gear change is being performed, it is required to allow automatic engagement and disengagement of the clutch. If it is determined that a gear change is not currently being performed, the system moves on to step 202.

In step 202, it is determined, on the basis of the output of the clutch pedal stroke sensor 16, whether the clutch pedal 11 has been released. Specifically, it is determined whether the output voltage of the clutch pedal stroke sensor 16 shows a value that corresponds to clutch engagement. If it is determined that the clutch pedal 11 has been released, the system moves on to step 203. If it is determined that the clutch pedal 11 has not been released, the system moves on to step 207.

In step 203, it is determined whether the current clutch rotational speed has exceeded the clutch disengagement rotational speed $N_B$ (=900(rpm), see FIG. 6). If that is the case, the system moves on to step 204 and the built-in timer is incremented. Next, the system moves on to step 205 and determines whether the timer count has exceeded a prescribed value T (e.g., 5 seconds). Because the answer at step 205 is NO at the beginning, the present sequence is repeated, but when the prescribed value is exceeded after a while, the system goes into the YES state and it is determined Condition 2 is fulfilled in step 206.

When Condition 2 is fulfilled, the system cancels the prohibition on automatic engagement/disengagement, and TMCU 9 turns all the solenoid valves MVC1, MVC2 and MVCE (FIG. 3) on or off appropriately in accordance with the current driving conditions and travel conditions.

If it has been detected in step 203 that the clutch rotational speed has dropped below the disengagement rotational speed $N_B$, the timer is cleared and it is determined that Condition 2 is not fulfilled in step 208. This is the same as when it is determined in step 202 that the clutch pedal 11 has not been released.

Even if the clutch is engaged and the clutch disengagement rotational speed $N_B$ is temporarily or instantaneously exceeded (YES at step 203), the system is ultimately moved onto NO at step 203 if the clutch rotational speed finally drops below the clutch disengagement rotational speed $N_B$ in the predetermined period T. In such a case, the timer is cleared (step 207) and the initial state is restored (step 208). The prohibition on automatic engagement/disengagement is not lifted until a clutch rotational speed becomes constantly as high as exceeding the clutch disengagement rotational speed $N_B$.

As described above, if the manual engagement/disengagement of the clutch is selected intentionally by the driver when moving off the vehicle, the automatic engagement/disengagement is prohibited. Consequently, the interference from the automatic engagement/disengagement can be prevented. In this way, it is possible to enable a vehicle to move off smoothly in accordance with the driver's wishes as well as to prevent the jerking off of the vehicle.

In addition, after the prohibition is imposed on the automatic engagement/disengagement, that prohibition can be cancelled if the vehicle enters in a stable moving state. In this fashion, the ordinary state can be restored when the vehicle is running in an ordinary condition, so that the properties of the system can be demonstrated to the full extent.

Furthermore, the present invention is not limited to the embodiments given above. For example, vehicles to which the present invention is applied are not limited to tractors.

What is claimed is:

1. For use with a selective clutch including an autoclutch device having a friction clutch, a clutch actuator which engages and disengages said friction clutch, and a controller which controls engagement and disengagement operations of said friction clutch by issuing commands to said clutch actuator; and a manual clutch device which engages and disengages said friction clutch on the basis of depressing of a clutch pedal, a control device comprising:
   a vehicle velocity detector for detecting a vehicle velocity;
   a gear speed detector for detecting a gear speed of a gear box;
   a clutch pedal depression detector for detecting an amount of depression of the clutch pedal; and
   a second controller for prohibiting clutch disengagement and engagement by means of the autoclutch device or canceling the prohibition on the basis of detection results of said vehicle velocity detector, of said gear speed detector and of said clutch pedal depression detector, and wherein said second controller prohibits the clutch disengagement and engagement by the autoclutch device when the following conditions are fulfilled: the vehicle velocity is zero, a current gear speed or a target gear speed is other than neutral, and a gear speed prior to the current gear speed or the target gear speed is neutral.

2. The control device for a selective clutch as claimed in claim 1, wherein said second controller cancels the prohibition on the clutch disengagement and engagement by the autoclutch device if a gear changing state is detected, or if the clutch pedal is released and a rotational speed of the friction clutch exceeds a prescribed value suitable for disengaging of the friction clutch.

3. The control device for a selective clutch as claimed in claim 1, wherein said second controller cancels the prohibition on the clutch disengagement and engagement by the autoclutch device if a gear changing state is detected, or if the clutch pedal is released and a rotational speed of the friction clutch exceeds a prescribed value suitable for disengaging of the friction clutch.

4. The control device for a selective clutch as claimed in claim 2, wherein the prescribed value is about 900 rpm.

5. The control device for a selective clutch as claimed in claim 3, wherein the prescribed value is about 900 rpm.

6. The control device for a selective clutch as claimed in claim 2, wherein the second controller does not cancel the prohibition unless the friction clutch rotational speed continuously exceeds the prescribed value for a predetermined period.

7. The control device for a selective clutch as claimed in claim 3, wherein the second controller does not cancel the prohibition unless the friction clutch rotational speed continuously exceeds the prescribed value for a predetermined period.

8. The control device for a selective clutch as claimed in claim 2, wherein the second controller does not cancel the prohibition unless the clutch pedal is depressed.

9. The control device for a selective clutch as claimed in claim 3, wherein the second controller does not cancel the prohibition unless the clutch pedal is depressed.

10. For use with a selective clutch including an autoclutch device for automatically disengaging and engaging a clutch and a manual clutch device for disengaging and engaging the clutch upon depressing of a clutch pedal, a control device comprising:
    means for detecting a vehicle velocity;
    means for detecting a gear speed of a gear box;
    means for detecting depression of the clutch pedal; and
    a controller for prohibiting the autoclutch device from automatically disengaging and engaging the clutch or canceling prohibition on the autoclutch device based on detection results of the vehicle velocity detection means, gear speed detection means and clutch pedal depression detection means, and wherein the controller prohibits the autoclutch device from automatically disengaging and engaging the clutch when the following conditions are fulfilled: the vehicle velocity is zero, a current gear speed is other than neutral, the clutch pedal is depressed, a previous shift lever position is neutral, and a current shift lever position is other than neutral.

11. The control device for a selective clutch as claimed in claim 10, wherein the controller cancels the prohibition on the autoclutch device if a current gear speed is not equal to a target gear speed.

12. The control device for a selective clutch as claimed in claim 10, wherein the controller cancels the prohibition on the autoclutch device if a current gear speed is not equal to a target gear speed.

13. The control device for a selective clutch as claimed in claim 10, wherein the controller cancels the prohibition on the autoclutch device if the clutch pedal is released and a rotational speed of the clutch exceeds a prescribed value suitable for disengaging of the clutch.

14. The control device for a selective clutch as claimed in claim 10, wherein the controller cancels the prohibition on the autoclutch device if the clutch pedal is released and a rotational speed of the clutch exceeds a prescribed value suitable for disengaging of the clutch.

15. The control device for a selective clutch as claimed in claim 13, wherein the prescribed value is about 900 rpm.

16. The control device for a selective clutch as claimed in claim 14, wherein the prescribed value is about 900 rpm.

17. The control device for a selective clutch as claimed in claim 13, wherein the controller does not cancel the prohibition unless the friction clutch rotational speed continuously exceeds the prescribed value for a predetermined period.

18. The control device for a selective clutch as claimed in claim 14, wherein the controller does not cancel the prohibition unless the friction clutch rotational speed continuously exceeds the prescribed value for a predetermined period.

* * * * *